(12) United States Patent
Bell

(10) Patent No.: US 6,470,735 B1
(45) Date of Patent: Oct. 29, 2002

(54) SIMPLE DRIVELINE CONDITION SENSING SYSTEM

(75) Inventor: Dale K. Bell, Ortonville, MI (US)

(73) Assignee: Meritor Heavy Vehicle Systems, LLC, Troy, MI (US)

(*) Notice: Subject to any disclaimer, the term of this patent is extended or adjusted under 35 U.S.C. 154(b) by 0 days.

(21) Appl. No.: 09/510,553

(22) Filed: Feb. 22, 2000

(51) Int. Cl.$^7$ ............... G06F 7/70; F01M 11/00; B60Q 1/00
(52) U.S. Cl. ............... 73/53.05; 73/10; 184/6.4
(58) Field of Search ............... 73/53.05, 53.06, 73/118.1, 116, 10; 184/6.4, 108

(56) References Cited

U.S. PATENT DOCUMENTS

| | | | |
|---|---|---|---|
| 4,000,656 A | * | 1/1977 | Moioli ............... 73/432 R |
| 4,839,831 A | * | 6/1989 | Imajo et al. ............... 364/550 |
| 4,847,768 A | * | 7/1989 | Schwartz et al. ...... 364/424.93 |
| 4,967,035 A | * | 10/1990 | Liljenfeldt et al. ............ 73/116 |
| 5,060,156 A | * | 10/1991 | Vajgart et al. ......... 364/424.03 |
| 5,275,258 A | * | 1/1994 | Bousseau ..................... 184/6.4 |
| 5,540,086 A | * | 7/1996 | Parker et al. ............... 73/53.05 |
| 5,633,796 A | * | 5/1997 | Cullen et al. ......... 364/424.035 |
| 5,679,883 A | * | 10/1997 | Wedeven et al. ............... 73/10 |
| 5,742,920 A | * | 4/1998 | Cannuscio et al. ......... 701/102 |
| 6,208,245 B1 | * | 3/2001 | Post et al. ............... 340/457.4 |

* cited by examiner

Primary Examiner—Daniel S. Larkin
Assistant Examiner—David J. Wiggins
(74) Attorney, Agent, or Firm—Carlson, Gaskey & Olds

(57) ABSTRACT

A system for monitoring the condition of a lubricant in a driveline component monitors the temperature of the lubricant and compares it to an ambient temperature. A temperature differential is stored as a function of time, and if that differential temperature increases beyond a predetermined amount, then an indication is made that lubricant maintenance may be in order. To further refine this system, the compared temperature differentials may be selected under similar load conditions.

8 Claims, 1 Drawing Sheet

SIMPLE DRIVELINE CONDITION SENSING SYSTEM

BACKGROUND OF THE INVENTION

This invention relates to a simple system and method for monitoring the operational health of a driveline component. In particular, the system takes a historic record of the differential temperature between the component and the ambient temperature, and looks for increasing temperature differential as evidence of an upcoming failure.

Driveline components are exposed to challenging environmental conditions. A driveline typically includes elements such as the transmission, the axles, etc. The components transmit a high level of torque, and are further subject to challenging environmental conditions.

The components are also typically supplied with a lubricant. The lubricant can become contaminated, or degrade over time. If the lubricant becomes contaminated or degrades, it should be supplemented or replaced.

Various complex systems have been proposed in the past which attempt to evaluate the contamination level of the lubricant and provide a signal when the contamination level exceeds a predetermined maximum. Moreover, systems which simply look for a predetermined trigger temperature have also been utilized. These systems are unduly complex and further do not provide feedback as accurate as would be desired. As an example, the temperature of the component could vary with environmental temperature.

SUMMARY OF THE INVENTION

In a disclosed embodiment of this invention, a differential temperature between the ambient and a driveline component is sensed and stored. If that differential temperature changes over time by a predetermined amount, then an indication is made that the component may require lubricant maintenance. Moreover, by looking to the differential temperature, an accurate indication is reached.

The system may be relatively simple and merely compare the differential temperature, regardless of load. Alternatively, a more refined system may look for differential temperatures under similar load conditions. The load condition could be the engine output speed or torque, or other variables such as the injection pressure or the fluid flow rate to the engine.

This simplified system will allow an operator to actively monitor the condition of the driveline components, and will provide an indication when the lubricant requires maintenance.

These and other features of the present invention can be best understood from the following specification and drawings, the following of which is a brief description.

DETAILED DESCRIPTION OF A PREFERRED EMBODIMENT

Figure 1:
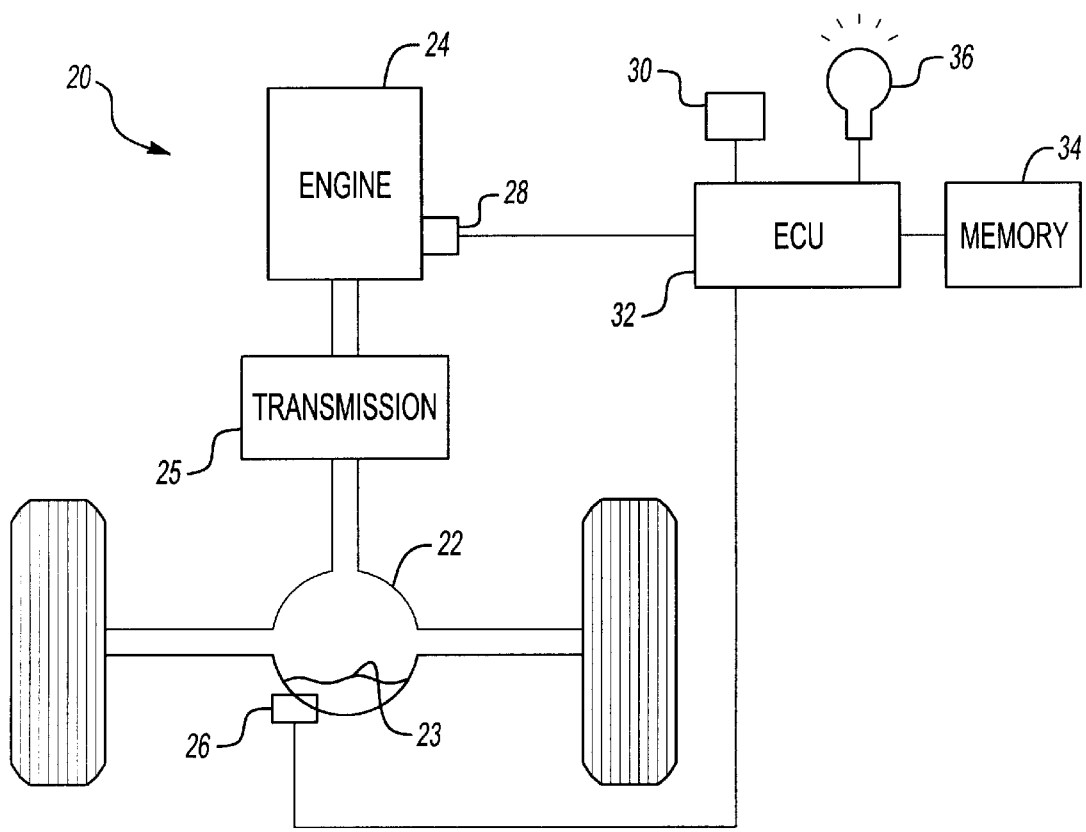
FIG. 1 is a schematic view of a system incorporating the present invention.

A system 20 is illustrated in FIG. 1 having a driveline component 22 shown as an axle housing. The driveline is driven by an engine 24. As is known, a transmission 25 is typically disposed between the engine and the axle housing. While the present invention will be described with regard to an axle housing, other components, and in particular, the transmission, will benefit from this invention. The axle housing is provided with a lubricant level 23. A sensor 26 is incorporated into the axle housing to sense the temperature of the lubricant within the axle housing. A second sensor 28 is associated with the engine and senses a load characteristic of the engine. Examples of acceptable load characteristics would be the engine output speed, the torque, or fuel based conditions such as the injection pressure or the fluid flow rate of the fuel leading to the engine. The signals from sensors 26 and 28, and a third sensor 30 sensing ambient temperature are all delivered to an electronic control unit 32. The electronic control unit 32 is provided with a memory 34 which stores the accumulated data. The electronic control unit 32 compares and stores the difference between the component oil temperature 26 and the ambient temperature 30. Further, these temperature differentials may be associated with a particular load value 28. In a even more simplified system, the load data 28 may not be necessary; however, in a most preferred embodiment, the load data is also utilized.

The electronic control unit 32 compares the temperature differential over time. If the temperature differential has increased by a predetermined amount, then a warning signal 36 is sent. The warning signal 36 could be visual, audible, electronically transmitted or may simply be stored in the control and be periodically accessed by maintenance personnel.

Figure 2:
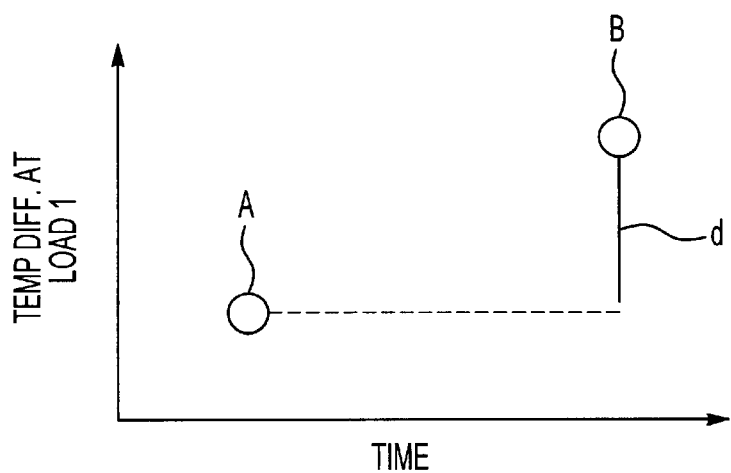
FIG. 2 is a graph showing one determination made according to the present invention.

FIG. 2 graphically shows a comparison which is preferably performed by the control 32. FIG. 2 shows the differential temperature at one particular load characteristic. The load characteristic would preferably be grouped by some incremental value into values such as load 1, load 2, etc. The differential temperatures would then be associated with particular load values, and compared over time by the alternate control unit 32. Thus, if the engine load characteristic were torque, the electronic control unit 32 would not associate only identical torque load characteristics, but rather the differential temperatures under approximately equal load characteristics.

As shown in FIG. 2, the differential temperature at A for the particular load at a first time period is shown, and is lower than the differential temperature B at a second time period. If the distance d between the differential temperatures at A and B exceeds a predetermined amount, then the electronic control unit 32 can make a determination that the lubricant in the component 22 needs maintenance.

Essentially, the present invention provides a very simplified method for monitoring and identifying problems with a lubricant condition.

While a preferred embodiment of this invention has been disclosed, a worker in this art would recognize that various modifications would come within the scope of this invention. For that reason, the following claims should be studied to determine the true scope and content of this invention.

What is claimed is:

1. A method of monitoring lubricant quality in a driveline component comprising the steps of:
   (1) monitoring the component temperature, and comparing said monitored temperature to an ambient temperature to determine a temperature differential;
   (2) storing said temperature differentials;
   (3) comparing said temperature differential over time; and
   (4) indicating a need for lubricant maintenance should said differential temperature increase over time, based upon said comparison of step 3.

2. A method as set forth in claim 1, wherein said indication of step (4) occurs if a predetermined difference in said differential temperature occurs over time.

3. A method of monitoring lubricant quality in a driveline component comprising the steps of:

(1) monitoring the component temperature, and comparing said monitored temperature to an ambient temperature to determine a temperature differential;

(2) storing said temperature differentials;

(3) comparing said temperature differential over time;

(4) indicating a need for lubricant maintenance should said differential temperature increase over time; and (5) said compared temperatures being selected from two times at similar load characteristics.

4. A method as set forth in claim 1, wherein a warning indication is sent should said determination of step (4) be made.

5. A system for monitoring lubricant quality comprising:

a driveline component receiving a lubricant;

a sensor for sensing a temperature within said driveline component;

a sensor for sensing an ambient temperature condition; and a control for comparing said component temperature and said ambient temperature and identifying a temperature differential, and for comparing temperature differentials over a period of time and making a determination as to lubricant quality based on changes in said temperature differential, said changes being determined based upon said comparison of temperature differentials over a period of time.

6. A system as set forth in claim 5, wherein a load characteristic of an engine driving said driveline component is also sensed, and said compared temperature differentials are selected to be at similar driveline load conditions.

7. A system as set forth in claim 6, wherein said control communicates with a warning signal generating device.

8. A system for monitoring lubricant quality comprising:

a driveline component receiving a lubricant;

a sensor for sensing a temperature within said driveline component;

a sensor for sensing an ambient temperature condition;

a control for comparing said component temperature and said ambient temperature and identifying a temperature differential, and for comparing temperature differentials over a period of time and making a determination as to lubricant quality based on changes in said temperature differential; and said driveline component is an axle housing.

* * * * *